United States Patent
Lemma et al.

(10) Patent No.: US 9,595,856 B2
(45) Date of Patent: Mar. 14, 2017

(54) ELECTRIC GENERATOR ARRANGEMENT AND METHOD FOR REDUCING A ROTOR ECCENTRICITY

(71) Applicant: SIEMENS AKTIENGESELLSCHAFT, München (DE)

(72) Inventors: Edom Lemma, Vejle (DK); Arwyn Thomas, Cheshire (GB)

(73) Assignee: SIEMENS AKTIENGESELLSCHAFT (DE)

( * ) Notice: Subject to any disclaimer, the term of this patent is extended or adjusted under 35 U.S.C. 154(b) by 401 days.

(21) Appl. No.: 14/489,518

(22) Filed: Sep. 18, 2014

(65) Prior Publication Data

US 2015/0084343 A1    Mar. 26, 2015

(30) Foreign Application Priority Data

Sep. 20, 2013   (EP) .................... 13185349

(51) Int. Cl.
*H02K 11/00* (2016.01)
*H02P 25/24* (2006.01)
(Continued)

(52) U.S. Cl.
CPC .......... *H02K 11/0094* (2013.01); *F03D 9/002* (2013.01); *H02K 3/28* (2013.01);
(Continued)

(58) Field of Classification Search
CPC ...... H02K 2201/03; H02K 3/28; F03D 9/002; H02P 25/24
(Continued)

(56) References Cited

U.S. PATENT DOCUMENTS 6,417,592 B2 *   7/2002   Nakamura ............... H02K 3/12
                                                   310/184
6,861,779 B2 *   3/2005   Weeber .................. H02K 13/12
                                                   310/148
(Continued)

FOREIGN PATENT DOCUMENTS

EP   2157314 A1   2/2010
EP   2498381 A1   9/2012

OTHER PUBLICATIONS

Khoo et al: "An AC self-bearing rotating machine with a single set of windings"; Proceedings of the 14th international symposium on power semiconductor devices & ICS, ISPSD 02, IEEE US; pp. 292-297; ISBN: 978-0-7803-7318-1; XP010602924; Jun. 4, 2002.

(Continued)

*Primary Examiner* — Hanh Nguyen
(74) *Attorney, Agent, or Firm* — Schmeiser Olsen & Watts LLP

(57) ABSTRACT

An electric generator arrangement with a stator being equipped with at least two opposed phase windings, each winding comprising at least two sub-windings in series is provided. The arrangement also comprises a controlled varistor across the connections of the sub-windings of said opposed phase windings. A current imbalance between two opposed phase windings is measured and the varistor is controlled in such a way that the resistance of the varistor is increased when the current imbalance increases.

8 Claims, 3 Drawing Sheets

Figure 1:
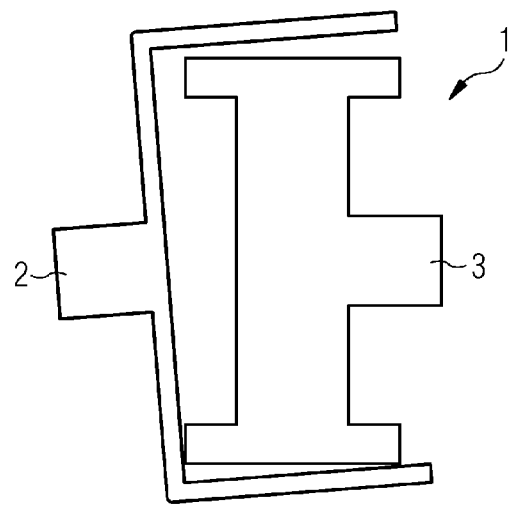

(51) Int. Cl.
*H02K 7/18* (2006.01)
*F03D 9/00* (2016.01)
*H02K 3/28* (2006.01)

(52) U.S. Cl.
CPC ............ *H02K 7/183* (2013.01); *H02K 11/20* (2016.01); *H02P 25/24* (2013.01); *H02K 7/1838* (2013.01); *H02K 2201/03* (2013.01); *Y02E 10/725* (2013.01)

(58) Field of Classification Search
USPC .............................. 310/93, 94, 68 R; 290/55
See application file for complete search history.

(56) References Cited

U.S. PATENT DOCUMENTS

2011/0133479 A1* 6/2011 Stiesdal ............... H02K 1/2786
290/55
2011/0241472 A1* 10/2011 Tanaka ..................... H02K 3/28
310/208

OTHER PUBLICATIONS

Extended European Search Report for EP Application No. 13185349.1, mailed Aug. 7, 2014.

* cited by examiner

ELECTRIC GENERATOR ARRANGEMENT AND METHOD FOR REDUCING A ROTOR ECCENTRICITY

CROSS-REFERENCE TO RELATED APPLICATIONS

This application claims priority to EP Application No. 13185349 having a filing date of Sep. 20, 2013, the entire contents of which are hereby incorporated by reference.

FIELD OF TECHNOLOGY

The following relates to an electric generator arrangement, comprising a generator having a stator and a rotor mounted to said stator free to rotate, wherein the stator is equipped with at least two opposed phase windings, each winding comprising at least two sub-windings in series. Moreover, the following relates to a method of controlling a rotor tilt/coaxial misalignment of an electric generator arrangement, the generator having said rotor mounted to a stator free to rotate, wherein the stator is equipped with at least two opposed phase windings, each winding comprising at least two sub-windings in series. Moreover, following relates to a wind turbine, comprising an electric generator arrangement.

BACKGROUND

Controlling the air gap of an electric generator as such is generally known. Because of tolerances, inhomogenities, external load conditions and current variations, the rotor of an electric generator can tilt and/or get eccentric. The eccentricity of the rotor can create unwanted effects, such as a decrease of electrical efficiency, and induce large forces on the generator structure, which can have negative effects on components of the generator, in particular on its bearings. Moreover the extreme forces on the generator could cause contact between the rotor and the stator and hence damage to components.

To date, proposals for controlling the air gap deflection are mainly based upon the Wheatstone bridge principle of stator winding arrangement and/or with mechanical stop means. However, the application of the Wheatstone bridge winding is limited to small power motors with the specific application of electrically levitating motor bearings. An example for such an arrangement is disclosed in Khoo, Fittro, Garvey, "An AC selfbearing rotating machine with a single set of windings", Power Electronics. Machines and Drives. 16-18 April 2002, Conference Publication No. 487, IEE 2002.

However, there is still a need to provide a solution for reducing the rotor eccentricity of a generator, especially for large scale power generators e.g. in applications such as wind turbines.

SUMMARY

This need may be met by the subject matter according to the independent claims. Advantageous embodiments of the present invention are described by the dependent claims.

According to a first aspect there is provided an electric generator arrangement as disclosed in the opening paragraph, additionally comprising a controlled varistor across the connections of the sub-windings of said opposed phase windings, a sensor for measuring the current imbalance of two opposed phase windings of said electric generator and an electronic circuit for controlling said varistor in such a way that the resistance of the varistor is increased when the current imbalance between said opposed stator/phase windings increases.

According to a further aspect there is provided a method of controlling a rotor eccentricity of an electric generator arrangement as defined in the opening paragraph, wherein the arrangement comprises a controlled varistor across the connections of the sub-windings of said opposed phase windings and wherein the method comprises the steps of measuring the current imbalance of two opposed phase windings of said electric generator and controlling said varistor in such a way that the resistance of the varistor is increased when the current imbalance increases.

This aspect is based on the idea that the eccentricity of a rotor can be deduced by means of local power monitoring or directly via air gap measurement and on the idea that an opposing force can be applied via the stator windings in order to reduce the air gap eccentricity. In particular, the rotor thus can be mounted to said stator with just a single bearing.

In particular, this concept can be applied to large power generators e.g. in applications such as wind turbines.

Accordingly, a wind turbine may comprise an electric generator arrangement with the generator coupled to the rotor of the wind turbine. In particular the generator can directly be connected to the rotor of the wind turbine, e.g. by means of a shaft. In this way, the disclosed particularly relates to a method of constructing a generator for a direct drive wind turbine with a single drive end bearing.

According to a further embodiment the stator is equipped with three pairs of opposed phase windings and the electric generator arrangement comprises three or more controlled varistors, each being arranged across the connections of the sub-windings of said opposed phase windings, three or more sensors for measuring the current imbalance of two opposed phase windings of said electric generator and an electronic circuit for controlling said varistors in such a way that the resistance of a varistor is increased when the current imbalance between opposed stator/phase windings connected to said varistor increases.

In this way the following may be applied to multi-phase-generators.

According to a further aspect the sensor for measuring the current imbalance of two opposed phase windings comprises a current sensor in each branch of a phase winding. In this way, easily available and proved means may be used for measuring the current imbalance.

According to yet another aspect the sub-windings of a phase winding have substantially similar inductance. In this way the conditions in the bridge arrangement of the branches and the varistor are basically symmetrical.

According to yet another aspect is a wind turbine comprising an electric generator arrangement comprising:

at least one turbine blade; and a generator having a stator and a rotor mounted to said stator free to rotate, wherein the stator is equipped with at least two opposed phase windings/segments, each winding/segment comprising at least two sub-windings in series, a controlled varistor across the connections of the sub-windings of said at least two opposed phase windings/segments, a sensor for measuring the current imbalance of two opposed phase windings/segments of said electric generator and an electronic circuit for controlling said varistor in such a way that the resistance of the varistor is increased when the current imbalance between said opposed phase windings/segments increases, wherein the generator is coupled to the rotor of the wind turbine.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of the subject matter, also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Figure 2:
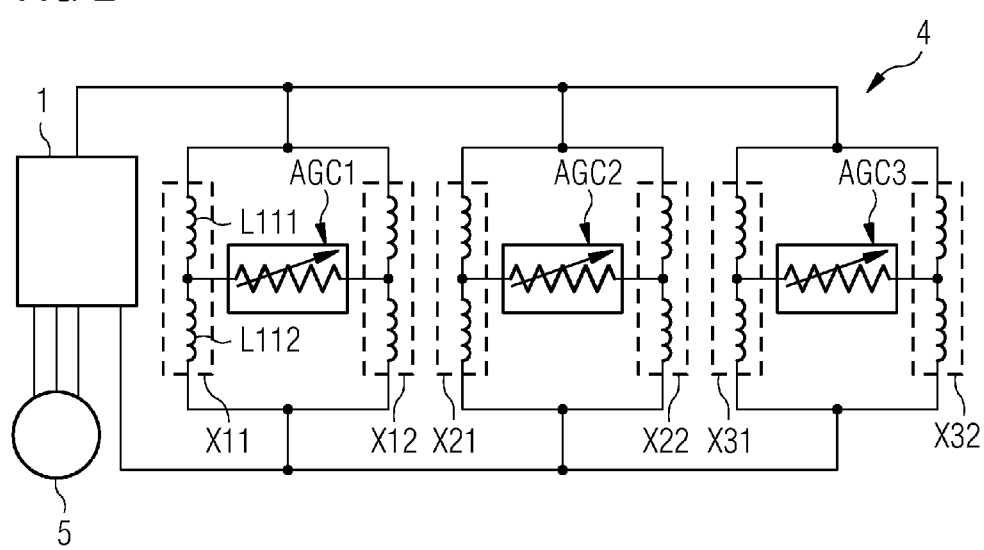
Figure 3:
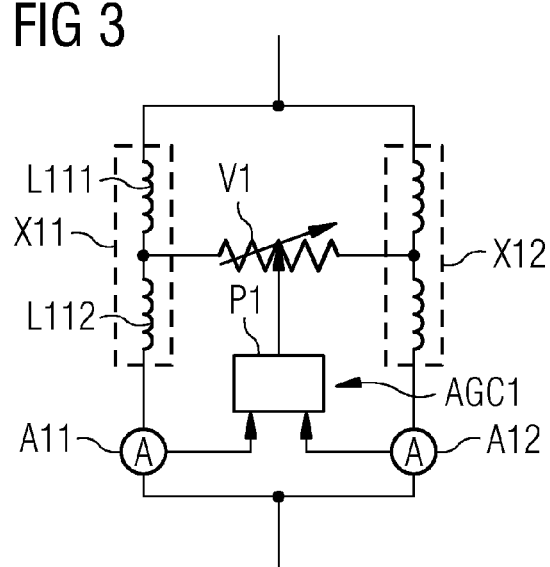
Figure 4:
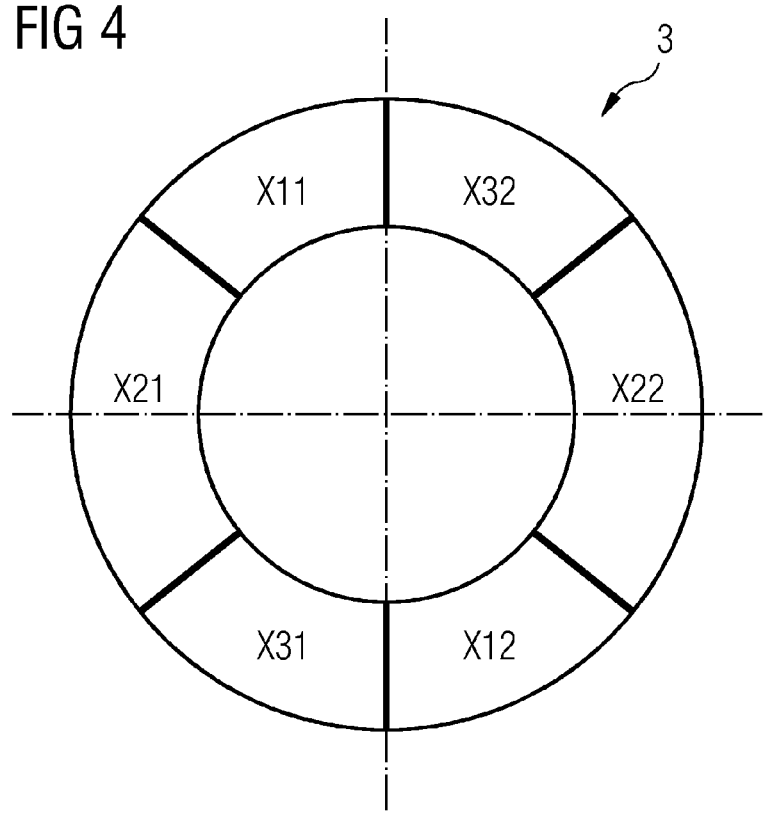
Figure 5:
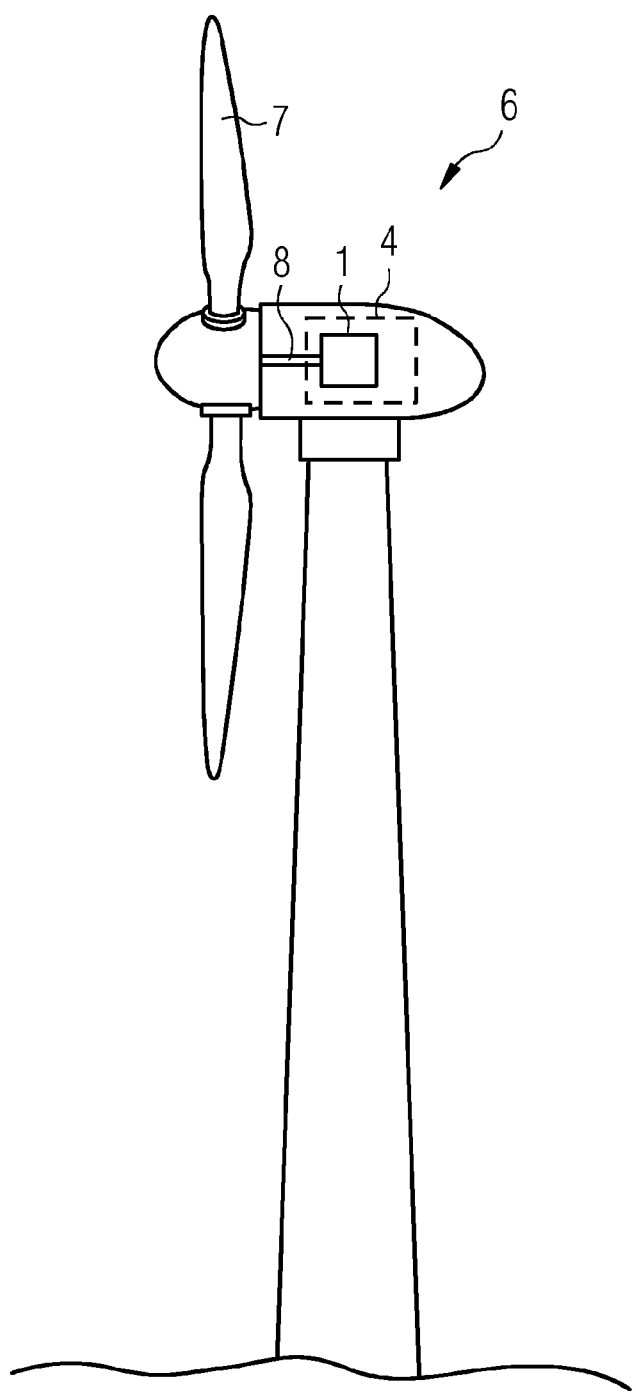

Some of the embodiments will be described in detail, with reference to the following figures, wherein like designations denote like members, wherein:

FIG. 1 schematically shows a rotor of an electric generator with eccentricity in relation to its stator;

FIG. 2 schematically shows a simplified electrical circuit of the generator arrangement;

FIG. 3 shows an air gap controller in more detail;

FIG. 4 schematically shows the circumferential arrangement of the phase windings of the electric generator; and FIG. 5 schematically an exemplary wind turbine with the electric generator arrangement.

DETAILED DESCRIPTION

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been explained with respect to a previously described embodiment are not explained again at a later position of the description.

FIG. 1 schematically shows a rotor 2 of an electric generator 1 with eccentricity in relation to its stator 3 to demonstrate the basic problem of the disclosed.

FIG. 2 schematically shows a simplified electrical circuit of the generator arrangement 4, in particular the generator 1 connected to the grid 5 with the stator windings shown in an electric wiring diagram.

The Electric generator arrangement 4, comprises a generator 1 having a stator 3 and a rotor 2 mounted to said stator 3 free to rotate, wherein the stator 3 is equipped with three or more pairs of opposed phase windings or stator segments X11 . . . X32, each winding/segment X11 . . . X32 comprising two sub-windings L111, L112 in series. In FIG. 2 just the two sub-windings L111, L112 are denoted by means of reference signs for the sake of brevity. However, the other sub-windings may easily virtually be denoted with reference signs by following the numbering scheme.

The electric generator arrangement 4 furthermore comprises three or more air gap controllers AGC1 . . . AGC3 each comprising controlled varistors, which are arranged across the connections of the sub-windings L111, L112 of said opposed phase windings/segments X11 . . . X32. In FIG. 2 just the varistor of each air gap controller AGC1 . . . AGC3 is shown for the sake of brevity.

FIG. 3 now shows the air gap controller AGC1 in more detail. It comprises an electronic circuit P1, an electrically controlled varistor V1 connected to an output of the electronic circuit P1 and two current sensors A11 and A12 in each branch of a phase winding/segment X11 . . . X12, which are connected to an input of the electronic circuit P1.

Accordingly the arrangement 4 shown in FIG. 2 comprises three or more sensors for measuring the current imbalance of two opposed phase windings/segments X11 . . . X32 of the electric generator 1, each of the sensors comprising a current sensor A11, A12 in each branch of a phase winding/segment X11 . . . X32.

Finally, FIG. 4 schematically shows the circumferential arrangement of the phase windings/segments X11 . . . X32 of the electric generator 1. One can see that segments X11 and X12, X21 and X22 as well as X31 and X32 are each opposed.

The function of the electric generator arrangement 4 is as follows. For the sake of brevity, reference is made to just one pair of phase windings/segments X11 . . . X32, namely to the segments X11 and X12 of FIG. 3.

When the rotor 2 is coaxial with the stator 3, the currents through the segments X11 and X12 are substantially the same. When the rotor 2 tilts in one direction, let us say towards segment X11, the current drawn by segment X11 will be higher than nominal rated current due to more flux linkage between segment X11 and the rotor 2 with the magnets. At the same time, current drawn by segment X12 (diametrically opposed to segment 11) will be smaller than nominal.

By monitoring the current drawn from the segments X11 and X12 by means of the current sensors A11 . . . A12 a current imbalance between opposed phase windings X11 and X12 is detected.

The electronic circuit P1 now controls the varistor V1 in such a way that the resistance of the varistor V1 is increased when the current imbalance between the opposed phase windings X11 and X12 connected to said varistor V1 increases.

When the rotor 2 is coaxial with the stator 3, the resistance of the varistor V1 would theoretically be zero, and it is increased as the current imbalance increases. Accordingly, X12's armature reaction is forced to be more, which will enable to pull the rotor 2 in the direction of segment X12 and hence counteracting an enforced rotor (i.e. air gap) deflection.

The general function has been explained for just one phase. However, one can easily imagine that said principle works for any phase of an electrical generator 1. In this way, the inventive principle can be applied to an electrical generator 1 with any number of phases.

One can also imagine that the disclosure is not limited to the concrete embodiment shown in the Figures but may be applied to variations of the same.

The electronic circuit P1 may be any electronic circuit capable of capturing the currents through the segments X11 and X12 and deriving a signal for the varistor V1 from said currents. It may be an analogue, digital or mixed circuit. Accordingly, parts of the inventive method or the complete method may be steps of a computer program running in a processor. It may be included in a power converter (or power conditioner) assembly for ease controlling and packaging purposes.

In the arrangement 4 shown in the Figures the sub-windings L111, L112 of a phase winding X11 have substantially similar inductance. This is beneficial if the winding is done in such a way that series connections of the windings X11 . . . X32 are continuous in the circumferential direction. If winding is done discontinuous, wherein a winding set is interlaced between another winding set, the bridge point can be at the ends of these windings.

FIG. 5 finally schematically shows an exemplary wind turbine 6, comprising the electric generator arrangement 4, wherein 6 the generator 1 is coupled to the rotor 7 of the wind turbine 6. In this particular example the generator 1 is directly connected to the rotor 7 of the wind turbine 6 by means of the shaft 8. However, the generator 1 may also be coupled to the rotor by means of a gear.

Generally it is advantageous, if the rotor 2 of the generator 1 is mounted to the stator 3 with just a single bearing (e.g. situated in the rotor 2 in FIG. 1). In this way also a direct drive wind turbine with a single drive end bearing is disclosed.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

In order to recapitulate the above described embodiments one can state:

The technical features by which the problem can be solved are the winding arrangement shown in FIG. 2, in which the windings L111, L112 are arranged in such a way that the current across diametrically spaced coils/segments X11 . . . X32 can be altered by the air gap controllers AGC1 . . . AGC3. This allows for an adjustment in the air gap flux produced by the coils/segments X11 . . . X32 and therefore the air gap force produced by the armature reaction.

In other words the Wheatstone bridge principle is combined with the segmentation of the stator 3, allowing the design and control of the air gap controller AGC1 . . . AGC3 to be modular. This provides specific improvements in performance and cost savings in implementing a Wheatstone air gap controller in large electrical machines.

The invention claimed is:

1. An electric generator arrangement, comprising:
a generator having a stator and a rotor mounted to said stator free to rotate, wherein the stator is equipped with at least two opposed phase windings/segments, each winding/segment comprising at least two sub-windings in series, a controlled varistor across the connections of the sub-windings of said at least two opposed phase windings/segments, a sensor for measuring the current imbalance of two opposed phase windings/segments of said electric generator and
an electronic circuit for controlling said varistor in such a way that the resistance of the varistor is increased when the current imbalance between said opposed phase windings/segments increases.

2. The electric generator arrangement as set forth in claim 1, wherein the stator is equipped with three pairs of opposed phase windings/segments and wherein the arrangement comprises: three or more controlled varistors, each being arranged across the connections of the sub-windings of said opposed phase windings/segments,
three or more sensors for measuring the current imbalance of two opposed phase windings/segments of said electric generator, and an electronic circuit for controlling said varistors in such a way that the resistance of a varistor is increased when the current imbalance between opposed phase windings/segments connected to said varistor increases.

3. The electric generator arrangement as set forth in claim 2, wherein the sensor for measuring the current imbalance of two opposed phase windings/segments comprises a current sensor in each branch of a phase winding/segment.

4. The electric generator arrangement as set forth in claim 3, wherein the subwindings of a phase winding/segment have substantially the same inductances.

5. The electric generator arrangement as set forth in claim 4, wherein the rotor is mounted to said stator with just a single bearing.

6. A wind turbine comprising an electric generator arrangement comprising:
at least one turbine blade; and
a generator having a stator and a rotor mounted to said stator free to rotate, wherein the stator is equipped with at least two opposed phase windings/segments, each winding/segment comprising at least two sub-windings in series, a controlled varistor across the connections of the sub-windings of said at least two opposed phase windings/segments,
a sensor for measuring the current imbalance of two opposed phase windings/segments of said electric generator and
an electronic circuit for controlling said varistor in such a way that the resistance of the varistor is increased when the current imbalance between said opposed phase windings/segments increases, wherein the generator is coupled to the rotor of the wind turbine.

7. The wind turbine as set forth in claim 6, wherein the generator (1) is directly connected to the rotor of the wind turbine.

8. A method of controlling a rotor eccentricity of an electric generator arrangement, the generator having said rotor mounted to a stator free to rotate, the stator being equipped with at least two opposed phase windings/segments, each winding comprising at least two sub-windings in series, and the arrangement comprising a controlled varistor across the connections of the sub-windings of said opposed phase windings/segments, the method comprising the steps of:
measuring the current imbalance of two opposed phase windings/segments of said electric generator and
controlling said varistor in such a way that the resistance of the varistor is increased when the current imbalance increases.

* * * * *

UNITED STATES PATENT AND TRADEMARK OFFICE
CERTIFICATE OF CORRECTION

PATENT NO. : 9,595,856 B2  
APPLICATION NO. : 14/489518  
DATED : March 14, 2017  
INVENTOR(S) : Edom Lemma et al.

Page 1 of 1

It is certified that error appears in the above-identified patent and that said Letters Patent is hereby corrected as shown below:

In the Claims

Column 6, Line 22 (Claim 4, Line 2), please change "the subwindings" to --the sub-windings--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*